Nov. 24, 1953

J. H. WILSON 2,660,382

LEVEL WINDING DEVICE

Filed April 2, 1948

8 Sheets-Sheet 1

INVENTOR.
John Hart Wilson
BY
Wayland D. Keith
HIS AGENT

Nov. 24, 1953 J. H. WILSON 2,660,382
LEVEL WINDING DEVICE
Filed April 2, 1948 8 Sheets-Sheet 2
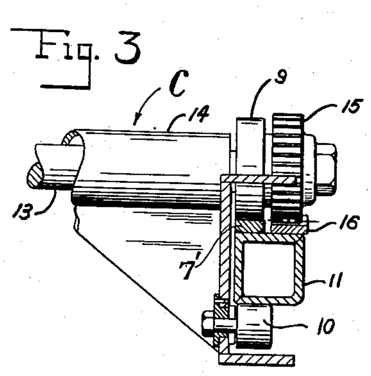
Fig. 3
Fig. 4A
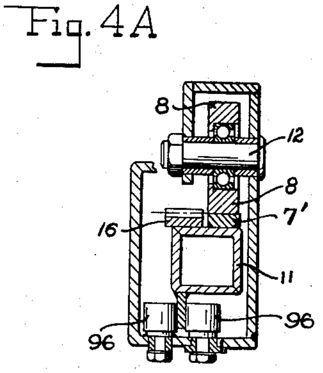
Fig. 4
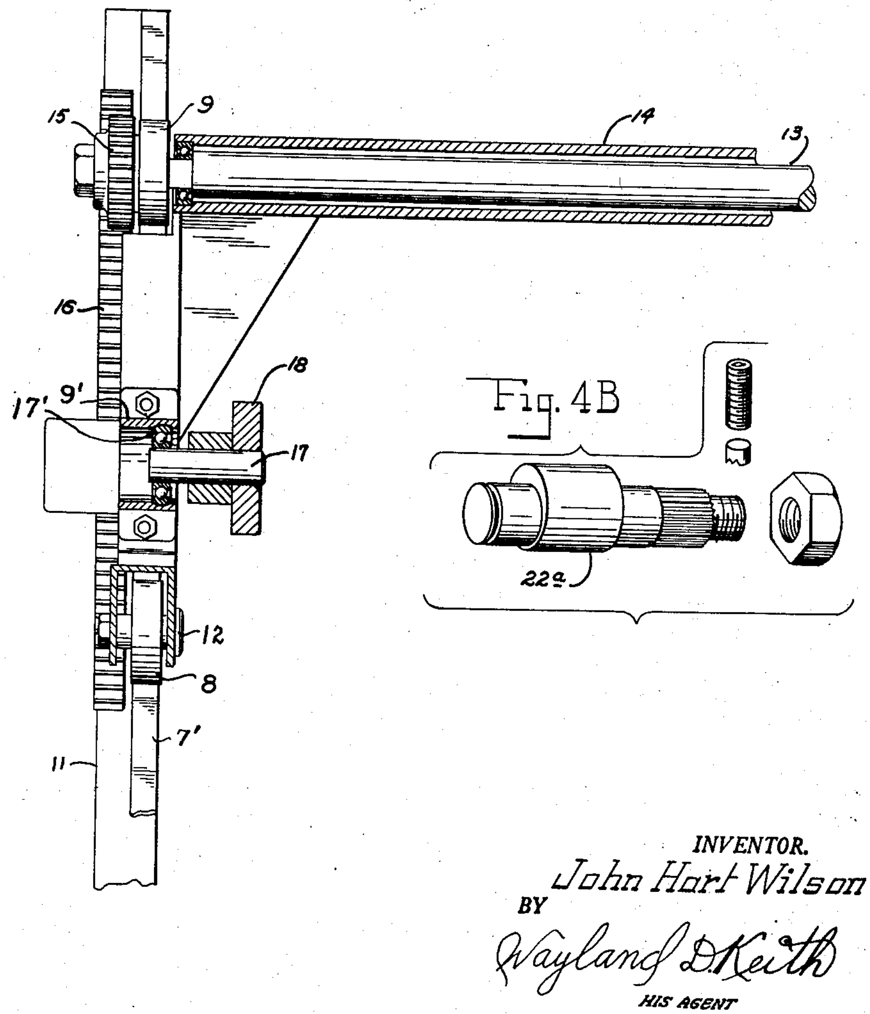
Fig. 4, Fig. 4B
INVENTOR.
John Hart Wilson
BY
Wayland D. Keith
HIS AGENT Nov. 24, 1953 J. H. WILSON 2,660,382

LEVEL WINDING DEVICE

Filed April 2, 1948 8 Sheets-Sheet 3

INVENTOR.
John Hart Wilson
BY
Wayland D. Keith
HIS AGENT

Nov. 24, 1953

J. H. WILSON 2,660,382

LEVEL WINDING DEVICE

Filed April 2, 1948

8 Sheets-Sheet 4

INVENTOR.

John Hart Wilson

BY

Wayland D. Keith

HIS AGENT

INVENTOR.

John Hart Wilson

BY Wayland D. Keith

HIS AGENT

INVENTOR.
John Hart Wilson
BY
Wayland D. Keith
HIS AGENT

Nov. 24, 1953

J. H. WILSON 2,660,382

LEVEL WINDING DEVICE

Filed April 2, 1948

8 Sheets-Sheet 7

INVENTOR.

John Hart Wilson

BY Wayland D. Keith

HIS AGENT

Nov. 24, 1953 J. H. WILSON 2,660,382

LEVEL WINDING DEVICE

Filed April 2, 1948 8 Sheets-Sheet 8

INVENTOR.
John Hart Wilson
BY
Wayland D. Keith
HIS AGENT

Patented Nov. 24, 1953

2,660,382

UNITED STATES PATENT OFFICE 2,660,382

LEVEL WINDING DEVICE

John Hart Wilson, Wichita Falls, Tex.

Application April 2, 1948, Serial No. 18,623

32 Claims. (Cl. 242—158)

This invention relates to improvements in level winding devices and particularly to devices for evenly spooling wire cable onto a drum. Winding drums and wire cable are used in the operation of many machines, as for example, rotary and cable tool drilling rigs, power hoists, winches, and the like.

The winding of a relatively heavy steel cable onto a winding drum in multi-layer thicknesses, and particularly when the diameter of the cable varies because it has become worn or stretched, has long been a source of trouble for operators of machines using such cable. Unevenly spooled cable becomes worn much more readily than evenly spooled cable. When the cable is used on well drilling rigs, the breaking of a line may cause much damage to the machinery and may even result in the loss of an oil well.

Various level winding devices have been proposed heretofore for use on cables, but these have not been constructed so as to effect tight winding of the cable under all conditions. Moreover, such winding devices have not been entirely satisfactory in providing for the even and uniform winding of the cable on the drum. They have required a control externally of the device, which was adapted to wind one size cable, and which did not compensate for the cable varying in diameter as result of stretching or wear thereof. The mechanism of a control of this character presented additional difficulties, for instance, it was necessary to change the mechanism for each size cable used.

The primary object of this mechanism is to improve the construction of lever winding devices to insure smooth and uniform winding of the cable regardless of variations in the size of the cable and regardless of the use of cable of different diameters which may be spliced together, and which device will wind the cable on the drum uniformly throughout the length of the drum, even though wound in multiple layers thereon, whereby the convolutions of the cable will be laid uniformly on the drum and on preceding layers thereof throughout the thickness of the winding.

Another object of the invention is to provide for an increase of the crowd angle of the first one or two turns of cable at the beginning of each layer as it is wound onto the drum to insure the tight winding thereof.

A further object of this device is to provide a level winding device which will automatically reverse itself in response to the natural transverse movement of the cable along the face of the drum while maintaining succeeding convolutions of the cable in tight side by said relation, not only in the middle thereof but at each of the opposite ends of the drum.

Still another object of the invention is to provide a cable winding device that will accommodate for variations in the diameter of the cable and for building up multiple layers thereof on the drum, whereby the cable would be wound tightly thereon even though several layers are superimposed thereon to considerable thickness.

Yet another object of the device is to provide a cable winding device which will evenly spool cable of different sizes without adjustment thereof.

These objects may be accomplished by providing a level winding device which utilizes a guide head for supporting the cable guiding means, and which guide head will travel back and forth substantially from end to end of the drum, and has provision for guiding the cable thereon and for providing a crowd angle to the cable throughout the major portion of the length of the drum to insure close, tight winding of succeeding convolutions of the cable substantially from end to end of the drum, and to provide a greater or super crowd angle for the first one or two convolutions at the beginning of each layer of cable.

Provision is made, preferably, whereby the guide head automatically reverses itself in response to the reversing of the direction of the transverse winding when this reaches either end of the drum so as to wind succeeding layers thereon. This provides for a tighter application of the first one or two convolutions at the beginning of each layer, as well as for even, tight application of the intermediate convolutions, as a result of the variation of the crowd angle to the cable passing onto the drum.

It is preferable to provide a compensating device that will direct the cable being wound onto the drum in a substantially tangential manner and without creating undue bind or strain on the cable guiding head so that each succeeding layer of cable will spool onto the winding drum in substantially the same relation with respect to the guiding head, as to the previous layers. This is especially important when using cable of relatively large diameter, and the layers of which would increase the diameter on which the cable is being wound. Provision is also made for changing the angle of the guiding head so as to maintain it substantially tangent, not only to the periphery of the drum, but to the periphery of the preceding layers of cable wound thereon.

These features are illustrated in an embodiment of the invention and a modification thereof, in the accompanying drawings, in which:

Fig. 3 is a cross section therethrough substantially on the line 3—3 of Fig. 2;

Fig. 4 is a horizontal section through a portion of the carriage, taken on the line 4—4 of Fig. 2;

Fig. 4A is a vertical sectional view through the guide rollers and carriage, taken on the line 4A—4A of Fig. 2, looking in the direction indicated by the arrows;

Fig. 4B is a perspective exploded view of an eccentric adjusting shaft and the cooperating parts associated therewith;

Figure 1:
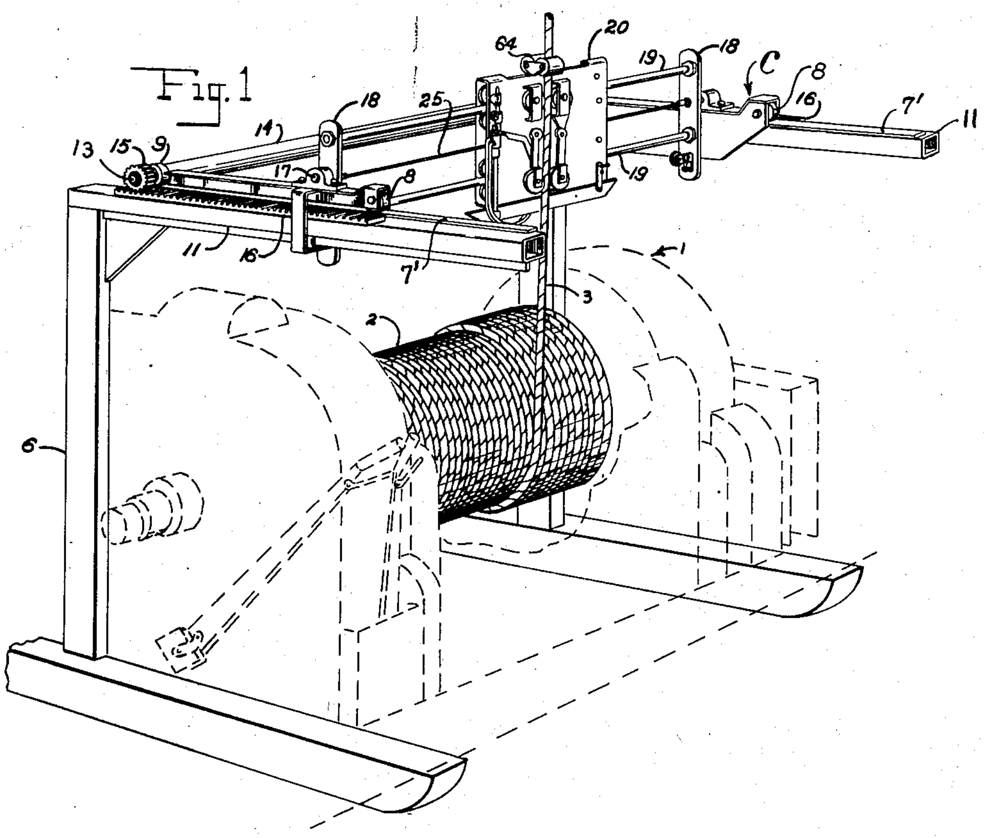
Fig. 1 is a perspective view of a portion of the winding device embodying the novel features of the invention.
Figure 5:
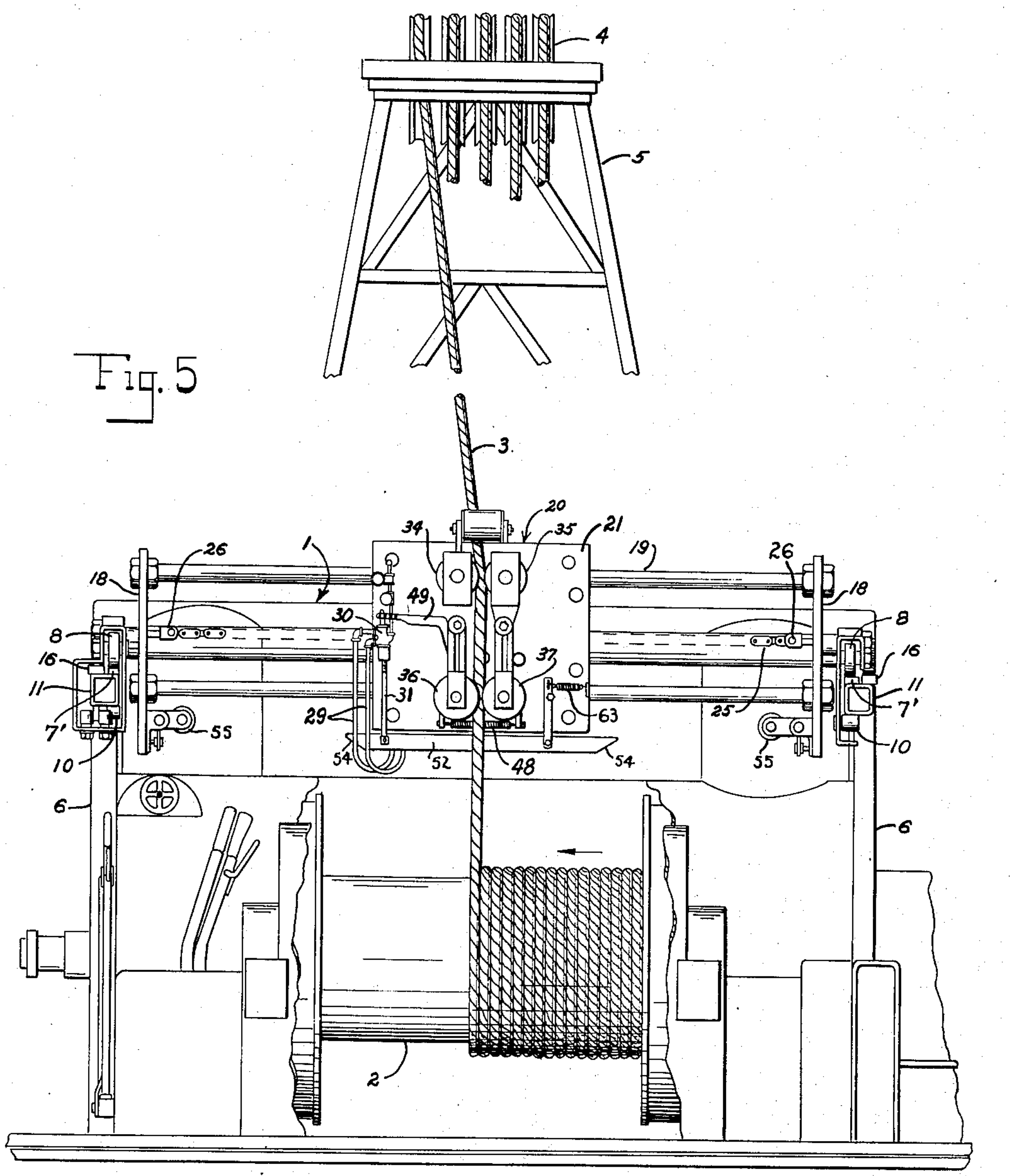
Fig. 5 is a front elevational view of the winding device shown applied to a drilling rig, and showing a fragmentary portion of the derrick associated therewith, with the fleet and crowd angles of the cable emphasized to more clearly illustrate the operation of the device.
Figure 6:
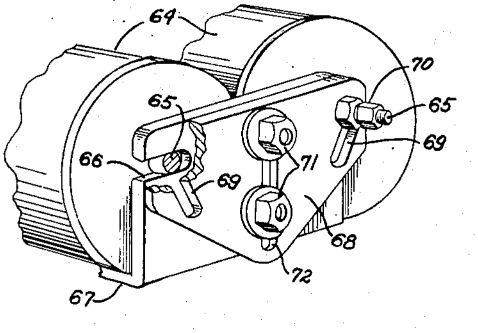
Fig. 6 is a detailed perspective view of a portion of the guide rollers, with parts broken away and shown in section.

The invention is shown in Figs. 1 and 5, as applied to an oil well rig designated generally by the numeral 1, and including a power winch having a cable drum 2, adapted to be rotated by power, in the customary manner of operating such a rig. A cable is shown at 3, which normally extends over a crown block 4, mounted on the usual oil well derrick 5, which derrick extends upwardly from the floor on which the rig 1 is supported.

In the drilling of oil and other deep wells, it is customary to support the drilling apparatus and accessories by a cable, such as is designated at 3, or to support a string of pipe, casing, or other parts used in connection with the drilling operation, by such a cable. This may involve a considerable length of cable which must be of a size to support the required weight; often the cable is in excess of one inch in diameter. The derrick is of considerable height and the cable is often wound and unwound at high speed, and at frequent intervals. Due to the length and size of the cable, the weight thereof is considerable, as also is the force necessary to be applied to the drum.

Unless the cable is wound evenly onto the drum or onto the peripherial surface of the cable previously wound, gaps will be left between the convolutions, and the next succeeding layer of cable will be forced into these gaps, and in pushing out again, considerable wear and abrasion to the cable will occur. When even a few strands of the cable become so worn as to be broken, the cable is weakened and must be replaced, which replacement is very expensive.

The speed of the operation of the drum 2 of the winch of the rig often results in considerable whipping of the cable in its passage from the crown block sheave 4 onto the drum. Furthermore, unless the cable is wound tightly on the drum, difficulty will be encountered in the unwinding of the cable when the tools, pipe, etc., are run into the well again.

I have provided an embodiment of this device which will be effective, not only in insuring the tight winding of the cable on the drum, but will also prevent the whipping action of the cable from being transmitted to the drum, which might otherwise result in considerable damage thereto.

In this embodiment of the invention, I have provided an upstanding support 6, adjacent the drum 2, which support may be the post which supports the headboard of the rig. This support 6 carries arms 11, that extend substantially horizontally, in the form illustrated, over the drum 2. The arms 11 support tracks 7', as guides for supporting the carriage, generally designated as C, thereon.

While the structure of this carriage C may be varied as desired, it is shown as provided with wheels 8 and 9, which wheels rest upon and are guided by the tracks 7', and cooperating wheels 10 underlying the arms 11, prevent accidental separation or removal of the carriage therefrom. Each end of the carriage C has a journal 12 for mounting one of the wheels 8. (See Figure 4A.) The opposite ends of the carriage C have journaled therein a shaft 13, which shaft extends throughout the length of the carriage and has one of the wheels 9 fixed near each end thereof. The shaft 13, preferably, is enclosed within a sleeve 14, which is rigidly fixed as by welding or is otherwise secured to the carriage C.

Also fixed on each end of the shaft 13, is a pinion 15, which pinion meshes with a rack 16 extending lengthwise of each track 7'. Thus the wheels 9 and pinions 15, at opposite ends of the carriage, are connected together so as to rotate uniformly and thereby insure uniform backward and forward movement of both ends of the carriage along the arms 11, such movement being regulated and guided by the racks and pinions 16—15. This provides a means for attaining such backward and forward movement of the carriage, although it is recognized that other means may be used for the purpose so long as the carriage is moved backward and forward uniformly at opposite ends to accommodate the cable 3, according to the thickness of the winding thereof on the drum 2, and to insure the cable extending tangent to the drum and to preceding layers of winding thereon.

Each end of the carriage C has an inwardly extending trunnion 17 journalled in a self-aligning bearing 17' provided in a pillow block 9' mounted on the carriage C; upon which trunnion 17 is pivotally mounted upright link 18. Guide rods 19 are fixed at opposite ends to the upper and lower ends of the links 18, and are carried thereby. These rods 19 form a trackway for supporting a guide head adapted to travel on the rods 19, as designated generally by the numeral 20, and shown in Figs. 1 to 15, inclusive. Any suitable trackway, formed of one or more rods, may be used.

Figures 11, 12:
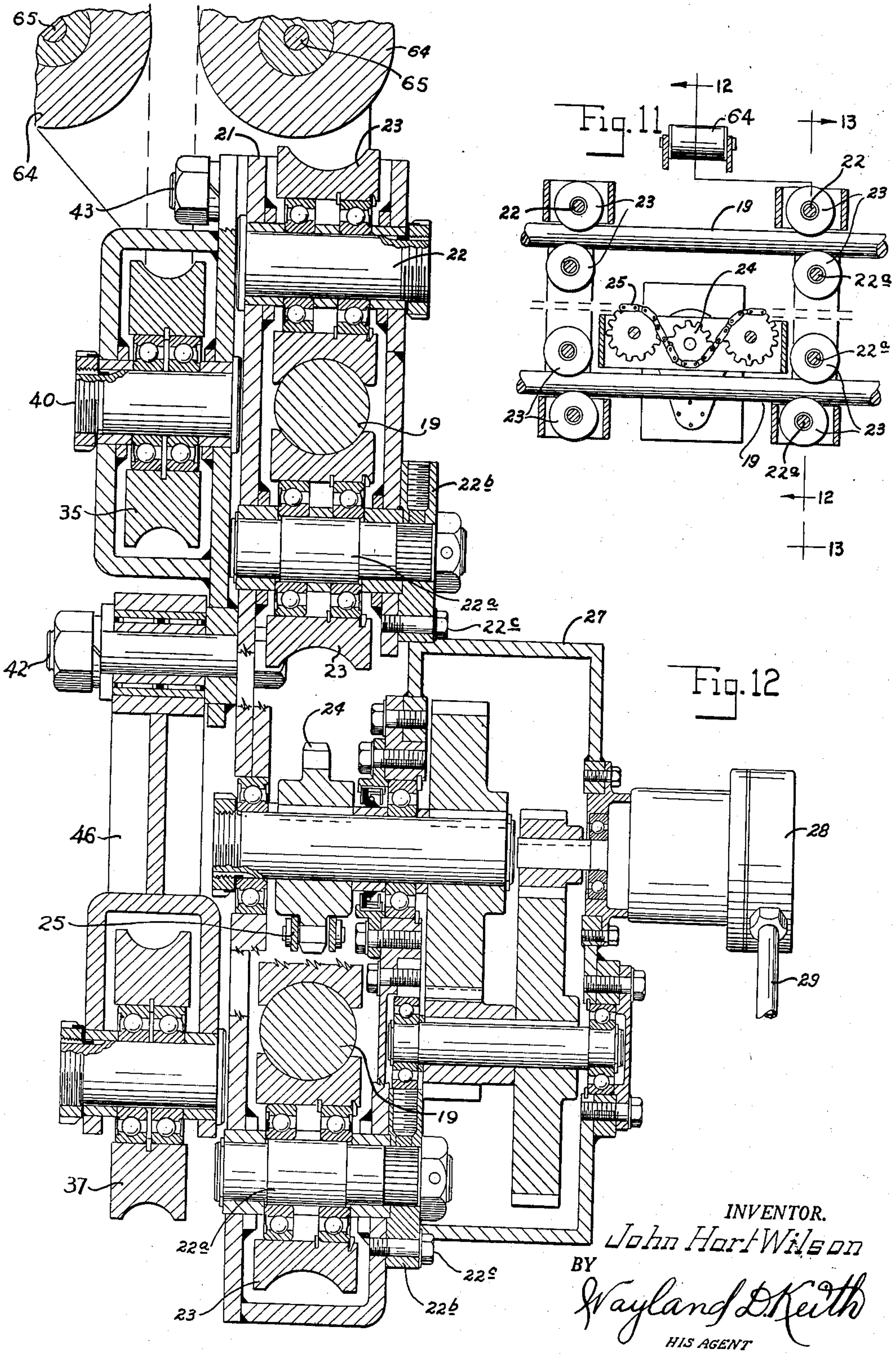
Fig. 11 is a longitudinal vertical sectional view through the guide head.
Fig. 12 is a transverse vertical sectional view therethrough, substantially on the line 12—12 of Fig. 11, looking in the direction indicated by the arrows.
Figure 13:
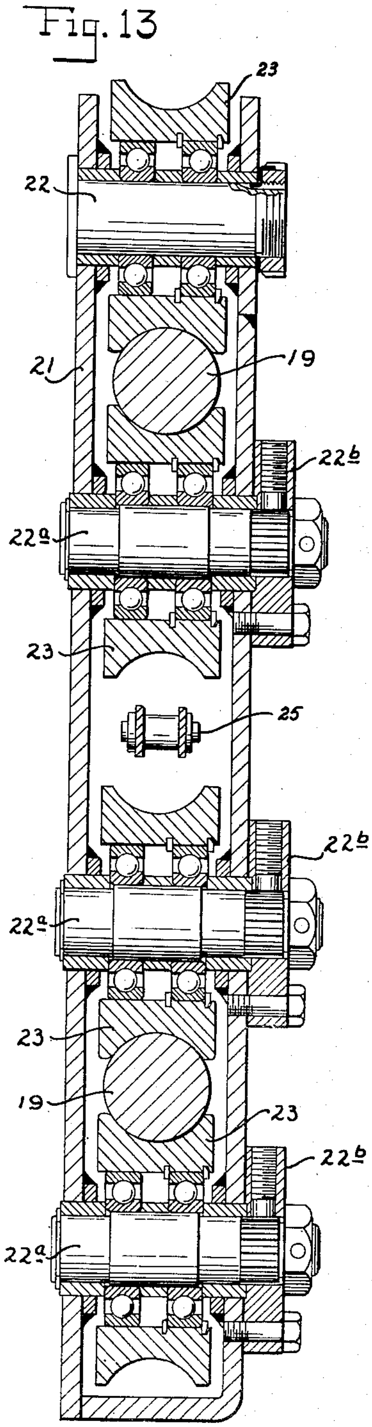
Fig. 13 is a sectional view taken on the line 13—13 of Fig. 11, looking in the direction indicated by the arrows.
Figure 14:
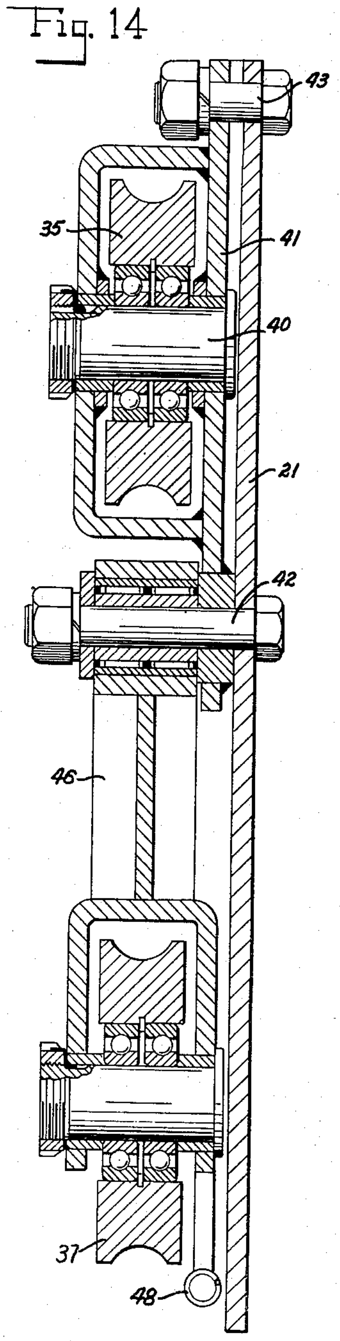
Fig. 14 is a vertical sectional view taken on the line 14—14 of Fig. 7, looking in the direction indicated by the arrows.

The guide head 20 includes an upright plate 21 in the form illustrated in Figs. 1 to 15. Journal pins 22 are carried by the plate 21 and extend laterally therefrom, as shown more in detail in Figs. 11 to 13. Wheels 23 are journaled on the pins 22, in pairs on opposite sides of the respective guide rods 19, as shown in Fig. 11, which wheels 23 support the guide head 20 upon the trackway for travel lengthwise thereof.

The journal pins 22, at the top of the guide head may be fixed with respect to the plate 21. However, the journal pin 22*a* below the top guide rails, if more than one is used, are adapted for adjustment to assure proper guiding relation between the wheels and the track. This is shown as provided by eccentric journals (Figs. 4B and 13) 22*a* for the lower guide wheels, each of which is attached to an adjusting disc 22*b*, mounted on the projecting end of the journal 22*a* and adapted to be locked in an adjusted position by the bolts 22*c*.

The movement of the guide head 20 lengthwise of the rods is accomplished by power. In the form illustrated, such power is applied by means of a sprocket wheel 24 engaging a sprocket chain 25, acting as a rack, that extends lengthwise of the winding device between the guide rods 19. The opposite ends of the sprocket chain 25 are secured by lugs to the links 18 or the trunnions 17. Thus upon operation of the sprocket wheel 24, the guide head will be moved along the chain 25, which motion may be directed lengthwise of the rods 19 in either direction with respect thereto.

In the form illustrated in Figs. 1 to 15, inclusive, the sprocket 24 is shown as operated by a speed reducing transmission 27 from a motor 28. While the character of the motor 28 may be varied as desired, any suitable power being capable of use for the purpose, I have shown as one example of the invention, a reversible air motor mounted upon the casing 27 of the transmission, which in turn is supported by the plate 21 of the guide head 20. The motor 28 is supplied with air under pressure through flexible conduits 29 extending therefrom to a valve, generally designated at 30 in Fig. 7.

The valve 30 is used for controlling the supply of air to one side or the other of the motor 28, according to the direction of turning movement desired for the sprocket 24 to move the guide head 20 lengthwise in one direction or another with respect to the cable drum 2. This form of valve has a casing adjustably mounted on a support 31, capable of vertical movement with respect to the plate 21, while a valve in the casing may be shifted by a valve stem 32 to admit air to one side or the other of the motor 28, or to close the air valve so that the air pressure therefrom will hold the motor and guide head in set position. The manner in which this is accomplished is described hereinafter. The power supply line for the air under pressure is designated generally at 33 as connected with one side of the casing of the valve 30.

Figure 7:
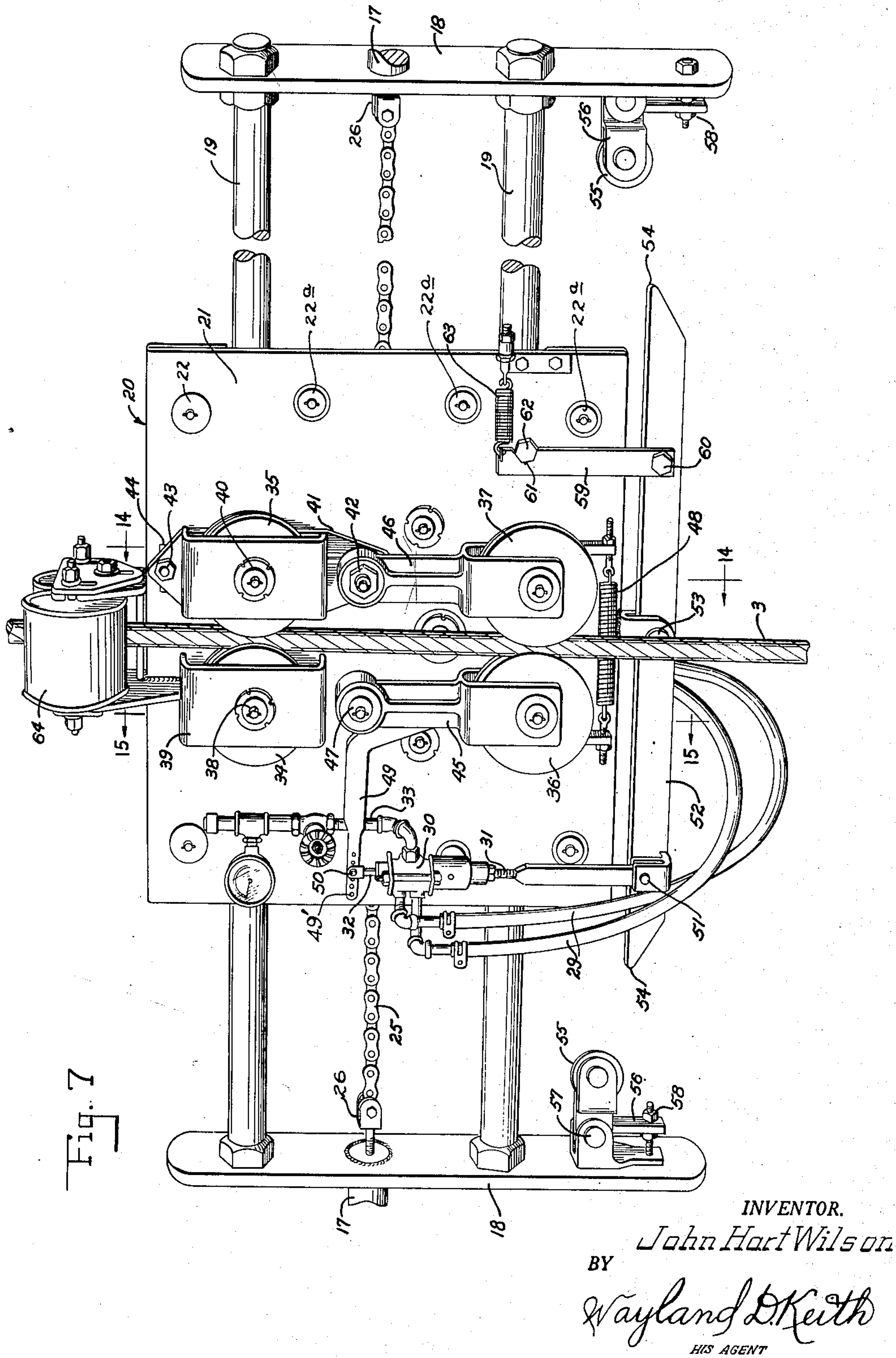
Fig. 7 is a perspective view of the guide head and its guides, from the front thereof.

A cable 3 is shown as guided between pairs of sheaves designated generally at 34, 35, and 36, 37 adapted to receive the cable between the sheaves of each pair as illustrated in Fig. 5 and Fig. 7. The sheaves 34 and 35, are respectively fixed and adjustable and normally are secured in rigid positions with respect to the plate 21, while the sheaves 36 and 37, are adapted to swing, being respectively control and follower sheaves. Each of the sheaves 34–37 has a peripheral guiding groove adapted to be engaged by the cable, which groove may be hard-surfaced to resist wear.

Figure 15:
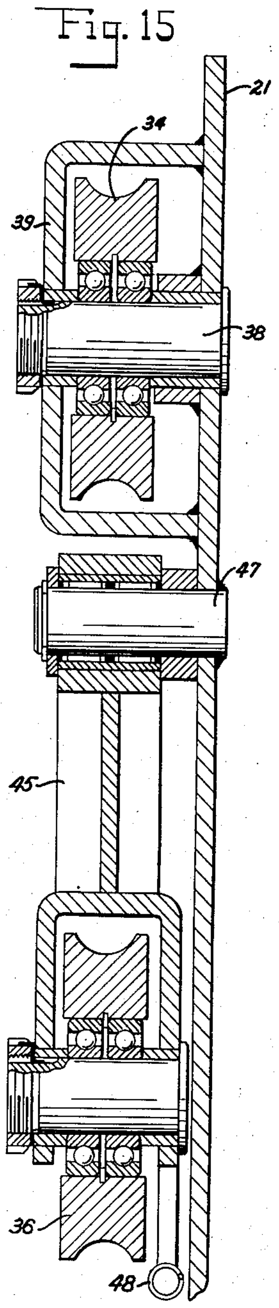
Fig. 15 is a similar view taken on the line 15—15 of Fig. 7, looking in the direction indicated by the arrows.

The fixed sheave 34 is mounted on a journal pin 38 connected to the plate 21, and is enclosed by a cover bracket 39, as shown in Figs. 7 and 15. The journal pin 38 is secured directly to the plate 21, while preferably the cover bracket 39 also is secured thereto, as by welding.

The adjustable sheave 35 is journaled on a pin 40 supported by a plate 41 which is pivotally mounted on a bolt 42 at its lower end, which bolt 42 is attached to the plate 21, while the upper end of the plate 41 is capable of lateral swinging movement with respect to the plate 21, such movement being for the adjustment of the sheave 35 toward and from the sheave 34 to accommodate cable of different sizes and to take up for wear in the sheave grooves. These parts may be secured in adjusted position by a bolt 43 extending through the plate 41, as shown in Fig. 7, and through a slot 44 in the plate 21 for limiting the adjusting movement of the sheave. After such adjustment, the parts are locked securely together by tightening the bolt 43.

The sheaves 36 and 37 are supported upon arms 45 and 46, which arms are pivotally mounted on the respective pins 47 and 42 which are secured to the trolley plate 21. These arms 45 and 46 are capable of yielding movement with respect to each other to accommodate cables of different sizes, and yet are adapted to hold the sheaves pressed against opposite sides of the cable, for which purpose I have shown a coiled spring 48, which connects together the lower ends of the arms 45 and 46.

The control arm 45 carries an outwardly extending valve arm 49 pivotally connected at 50 with the valve stem 32. The valve body 30 is threadably attached to the support rod 31 to make possible the adjustment of the valve body 30 with respect to the support rod 31, so as to provide the proper adjustment of the angle of the cable 3 with respect to the drum 2. The holes 49' in the arm 49, are for the adjustment of the crowd angle of the cable, which angle is the difference between a right angle to the axis of the drum and the angle at which the cable winds onto the drum. Thus, upon swinging movement of the arm 45, by the angular shifting of the cable with respect to the guidehead 20, the valve may be shifted to change the direction and speed of movement of the guide head, as hereinafter described.

The action of the pneumatic motor 28 is controlled by the bodily shifting of the body of the valve 30 by means of its support 31. The support 31 is pivotally mounted at 51 adjacent one end of a cam lever 52 pivotally supported at 53 on the underside of the plate 21. The opposite ends of the cam lever 52 are shown as somewhat beveled or rounded at 54, in position to be engaged by a roller 55 to shift the cam lever 52 at the end of the path of travel of the guide head 20. The guide head 20 is adapted to be moved to the right or to the left on guide rods 19 by reversible motor 26, or to be maintained in a stationary position, in accordance with the relative position of the valve member within the valve 30.

When the guide head 20 is traveling to the left, as shown in Fig. 7, the cam lever 52 is adapted to have the rounded end 54 thereof engage beneath roller 55, which will, in turn, move support rod 31 and valve body 30 downward with respect to the valve stem 32, which will admit more air to the motor to increase the speed thereof, to move the guide head faster in the same direction it is traveling for one or two turns of the cable at the left hand end of the drum 2. This will cause the cable 3 to be guided onto the drum 2 at substantially a right angle for the last one or two turns, and the arm 49 will swing to a position to cause the valve body 30 to shift so that the valve will be at a mid-point for a momentary dwell at the end of the drum. The cable will then spool back one or two turns at the beginning of this layer of winding, with the crowd angle greater than the normal crowd angle, before the arm 49 shifts and until the guide head 20 has moved sufficiently so that the roller 55 becomes disengaged from the cam lever 52 and will shift the valve body 30 upwardly relative to the valve stem 32. This speeds up the motor 28 so that the guide head will direct the cable winding onto the drum, against preceding convolutions, with a normal crowd angle, until the rounded portion 54 of the cam lever 52 engages roller 55 at the right end of the supporting frame. By depressing the cam lever 52 at the right hand end thereof, as shown in Fig. 7, this lever will pivot about pin 53 and move support rod 31 upward, which will speed up the guide head 20 for the last one or two convolutions of the cable, bringing the cable into substantially a right angle or with very little crowd angle with respect to the drum.

The cable will continue to spool until it reaches the end of the drum, one or two convolutions will then be made on the next layer of the winding at a super crowd angle until the guide head 20 moves outwardly sufficient to cause disengagement of the cam lever 52 from roller 55, at which time the normal crowd angle will again be imparted to the cable winding onto the drum, as previously set forth.

Figures 8, 9:
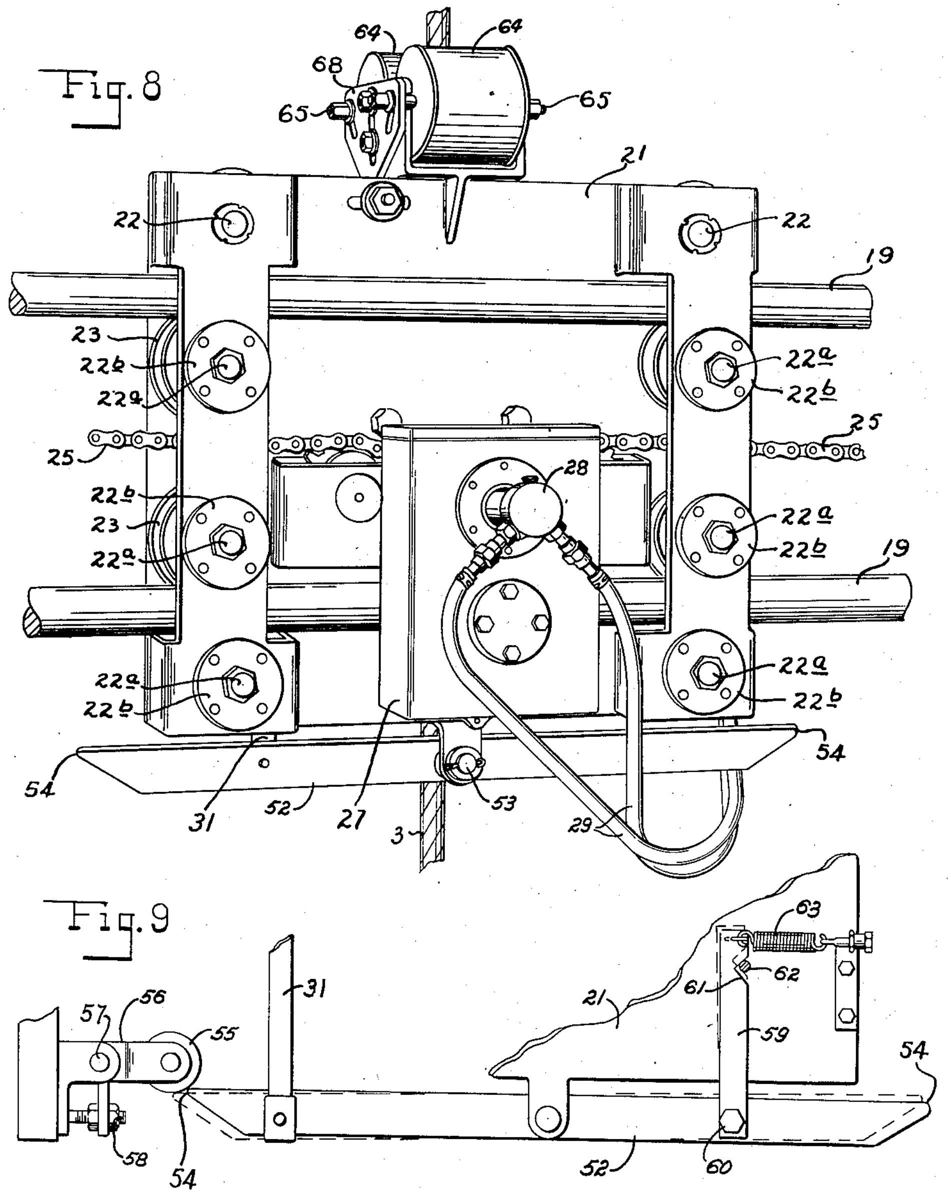
Fig. 8 is a similar view from the back thereof.
Fig. 9 is a side elevational view of the valve shifting cam member.
Figure 10:
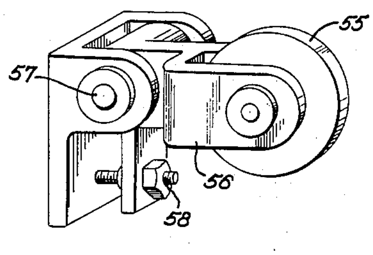
Fig. 10 is a perspective view of one of the shifting wheels detached from the machine.

The roller 55 is mounted on a bracket 56, which bracket is pivotally supported at 57 on each of the links 18. A set screw 58 may be used to adjust the position of the roller 55 to vary the extent of shifting of the cam lever 52 thereby, as shown in Fig. 9, for the purpose of adjusting the amount of the crowd angle at the beginning of each layer of winding.

Normally, the cam lever 52, when out of engagement with the rollers 55, is adapted to be maintained in a central position, for which purpose I have shown a link 59 pivotally connected at 60 with the cam lever 52. The opposite end of the link 59 is shown as having a notch 61 in an edge thereof in position to engage a pin 62. The notch 61 is substantially V-shaped, and this end of the link 59 is normally drawn toward the pin 62 by a coiled spring 63. Thus the tension of the spring 63 normally tends to center the notch 61, with respect to the pin 62, thereby tending to maintain the cam lever 52 in a central position, whereby either end thereof will engage the corresponding roller 55 adjacent the limit of the travel in one direction of the guide head 20.

In addition to the sheaves 34–37, the guide head 20 may be provided with an additional set of guide rollers, if desired, as illustrated generally at 64. The guide rollers 64 are shown as supported on the upper portions of guide head 20 by a mounting shown in detail in Fig. 6. These guide rollers 64, preferably, are of rubber or other cushioning material so as to facilitate the guiding of the cable thereby, and to prevent the transmission of the whip of the cable as it passes from the sheaves to the guide head, which will also prevent the transmission of such whip to the drum 2.

Each of the rollers 64 is shown to be of a construction such that the cushion body thereof is mounted on a shaft 65 that extends through slots 66 in opposite sides of a yoke 67 which is fixed to the head plate 21. The slots 66 are shown as extending horizontally, and the shafts 65 may be adjusted therein by means of a cam plate 68 at each end of the guide rollers 64. Each cam plate 68 has oblique slots 69 therein to receive the projecting ends of the shaft 65, so that upon vertical adjustment of the plates 68 relative to the yoke 67, the angular divergence of the slots 66 and 69 will cause outward or inward movement of the shafts 65, with respect to each other, thereby varying the spacing of the rollers 64 to accommodate cables of different diameters, and to adjust for the wear of the rollers.

The shafts 65 may be locked in set relation by nuts 70 threaded on the ends thereof, while the cam plates 68 are also secured in adjusted positions by bolts 71, to opposite sides of the yoke 67. These bolts extend through a slot 72 in each cam plate 68.

*Operation*

The cable 3 is started on the drum 2, and after it has made one or two turns thereon, the guide head 20 is moved by the air motor 28, in the direction of the winding action, as indicated by the arrow in Fig. 5. When the valve 30 admits air to the motor, the guide head 20 is so disposed with respect to the chain or rack 25 as to normally impart a crowd angle to the cable, the cable standing at an acute angle to a plane passing through the drum at a right angle to the axis thereof, in the direction of the wound portion of the layer of cable on the drum. This angle is slightly less than a right angle with respect to the axis of the drum, as shown in Fig. 5. This is regulated by the position of the guide head with respect to the winding being applied to the drum, whereby, the cable as it is being wound thereon, will apply pressure in the direction of the wound portion and against the sheave 36, when the parts are in the relation as shown in Figs. 5 and 7.

The action as described above, will swing the control arm 45 in the direction of winding and slightly out of the vertical position normally assumed thereby, the cable being guided between the fixed sheave 34 thereof, and the adjustable sheave 35. At the same time, the arm 49 holds the valve stem 32 raised with respect to the valve casing 30, thus applying fluid under pressure to operate the guide head in a direction to move said guide head in the direction of the winding action. The guide head is moved uniformly along the rods 19, and continues this movement substantially throughout the length of the drum 2, and imparts a crowd angle to the cable as it winds onto the drum which crowd angle is sufficient to cause the cable to wind snugly thereon.

Just before the winding reaches the end of the drum, the angular end 54 of the cam lever engages the roller 55, at the left in Fig. 5, sufficiently to depress the left end of the cam lever 52, which acts through the support rod 31 to depress the body of the valve casing 30. This further opens the port of the valve, since the valve stem 32 is maintained in a set position by the angular position of the control arm 45, which increases the speed of movement of the motor 28, thereby speeding up the travel of guide head 20. Very quickly the guide head will have moved sufficiently to shift the position of the cable, as it is wound onto the drum, to a position substantially normal to the axis of the drum, whereby no crowd angle, or only a small crowd angle will be imparted thereto during the last one or two turns of the cable on the drum.

As soon as the control arm is moved to its normal position by the shifting of the cable at the end of the drum to a position substantially normal to the axis of the drum, the valve, which is attached to the valve stem 32, will be shifted to stop the motor 28. The guide head will remain stationary until the cable has started to wind back on the drum and has made about one or two turns in the opposite direction. This will shift the angle of the cable in the opposite direction from the first described movement, sufficient to move the control arm 45 to open the valve 30 to admit fluid under pressure to the opposite side of the motor 28, changing the direction of the latter, and thereby causing the guide head 20 to be moved toward the opposite end of the drum, toward the right in Fig. 5. Such movement will be slow during one or two turns of the cable, allowing the winding to advance faster than the head whereby to apply an extra crowd angle to the winding on the drum. Thereafter, the cam lever 52 will disengage the roller 55, when the cam lever 52 will be centered by the V-notch 61 and pin 62, as the link 59 is moved under the influence of the spring 63. This movement of the valve body either upward or downward according to the direction of movement of the guide head, will increase the opening of the valve, and the speed of operation of the motor.

This action will be continued as the guide head moves toward the opposite end of the drum during the winding of the succeeding layer thereon, and the shifting action will be repeated at said opposite end substantially as described above. In this way, succeeding layers are built up on the drum, with the guide head continuing to move back and forth with respect thereto, changing its direction to guide the convolutions of the cable as these are applied to the drum.

When a cable of considerable diameter is used, such as is frequently employed on an oil well drilling rig, and when several layers are applied to the drum, the guide head 20 should be shifted so that the cable is directed thereon substantially tangent to the surface on to which the layers are applied. This is made possible by the mounting of the guides 19 on the pivotal supports or trunnions 17, to enable the guide head to swing to different angular positions, with respect to the periphery of the windings. The entire guide head and its supports may be moved forward and backward with respect to the drum by the carriage C on which these supports are mounted. It is preferred that the guide head be supported substantially on its vertical center of gravity so as to maintain a proper guiding relation on the cable, and a proper balance on the guide or guides 19 forming the trackway.

It is thus possible to guide the cable tightly onto the drum to insure uniform and smooth winding thereof, regardless of the diameter of the cable or the number of turns thereof applied to the drum. At the same time the winding action may be accomplished without any appreciable whipping of the cable with respect to the drum, and at a speed whereby the cable may be wound up quickly and readily. At the same time, the structure is sturdy and rigid, sufficient to take the stresses imparted thereto.

While the invention has been illustrated and described in one embodiment, it is to be recognized that variations and changes may be made therein without departing from the invention except as specified in the claims.

Figure 2:
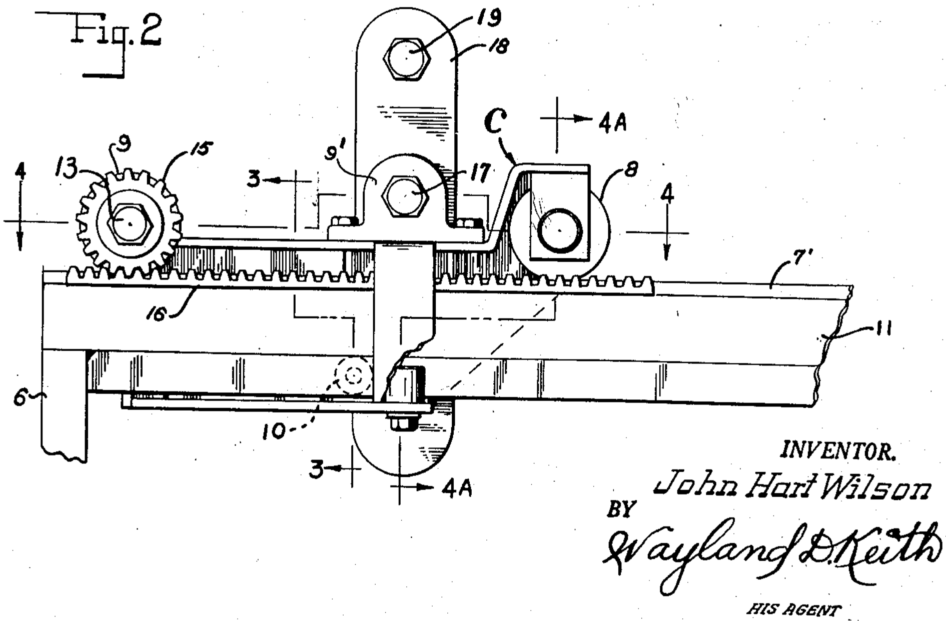
Fig. 2 is a fragmentary view of a portion of the device with parts broken away, and showing the device as attached to the frame of a drilling rig.
Figure 16:
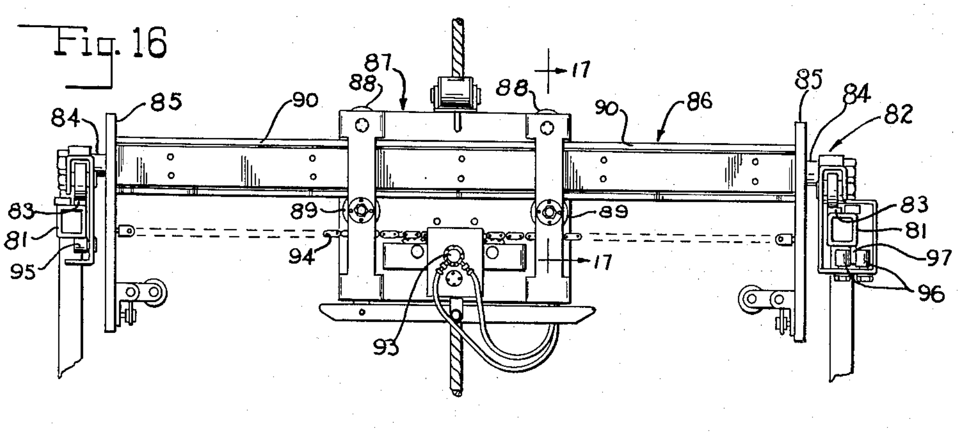
Fig. 16 is a rear view of a modified form of the level winding device, with the laterally extending supports shown in section.
Figure 17:
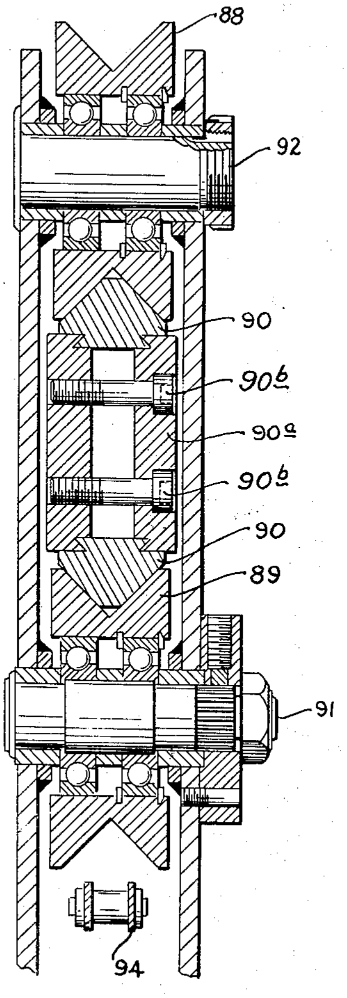
Fig. 17 is an enlarged sectional view taken on the line 17—17 of Fig. 16, looking in the direction indicated by the arrows.

A modified form of the device is shown in Figs. 16 and 17, and shows the device as mounted on supporting arms 81, which arms extend outward, substantially in the same manner as do the arms 11, in the form described above. A carriage 82, similar to that shown in Figs. 1 and 2, is mounted on the arms 81, and is adapted to move in geared relation with a rack 83 which is secured to the arms 81. This carriage supports at each of its ends, an axial trunnion member 84. A pair of upright end frame members 85 are mounted on trunnions 84, which end frame members in turn support a V-track support bar, designated generally at 86. A level winding guide head, generally designated at 87, is similar in construction to guide head 20, except for the guide track rollers. This guide head has V-type rollers 88 and 89 mounted thereon for engagement with the track members 90 of V-track support bar 86. The rollers 88 and 89 are journaled on anti-friction bearings on shafts 91 and 92. The shaft 91 is similar in construction to pin 22*a* of the form of the device as described above, and is provided with an eccentric adjustment for urging the roller 89 against the V-track member 90.

In this modified form of the device, a single V-track support bar 86 will admit of the utilization of four rollers to give the necessary support and alignment adjustment to the guide head 87.

The manner of operation and the adjustment of this form of the device is similar in all respects to that of the form heretofore described, that is, a reversible air motor 93, similar to that shown at 28 in Fig. 12, is utilized through a geared transmission, to drive a sprocket shown at 24 in Fig. 12, which in turn engages a sprocket chain 94 positioned between end frame members 85, so as to move the guide head 87 back and forth, substantially in the manner as described above.

The V-track support bar 86 is preferably an assembly composed of several bars, namely two V-track members 90 and the parallel laterally spaced center bar members 90*a*, which are secured together by bolts 90*b*. The V-track members 90 and bars 90*a* are adapted for interengagement in dove-tail construction, as shown in Fig. 17. This presents a very rigid structure, but at the same time, allows for the replacement of the V-track members 90, should they become worn.

A roller 95 is mounted to roll horizontally along the under surface of an arm 81 to prevent upward movement of the carriage 82. At one end of the carriage 82 a pair of rollers 96, having vertical axes, are engaged on opposite sides of a horizontal bar 97 which underlies and is attached to the other arm 81. These rollers 96 are shown also in Fig. 4A, as applied to the carriage C.

One of the rollers 96 preferably is mounted on an eccentric journal like that shown at 22a—22b, so that adjustment may be made to prevent lateral movement of the carriage.

Having thus described the invention, I claim:

1. In a cable winding device, traversing mechanism for laying successive turns of a cable on a drum including a guide head having cable guide means thereon, power means for moving the guide head in a direction to guide the cable, and means actuated by the cable for controlling the operation of the power means.

2. In a cable winding device, traversing mechanism for laying successive turns of cable on a drum including a power head having cable guide means thereon, means mounting the power head for reciprocating movement relative to the drum, and power means carried by the power head for moving the power head.

3. In a cable winding device, traversing mechanism for laying successive turns of a cable on a drum including a guide head having cable guide means thereon, power means for moving the guide head in a direction to guide the cable, and means responsive to changes in the angularity of the cable relative to the guide means for controlling the operation of the power means.

4. In a cable winding device, the combination with a winding drum and means for driving the drum, of traversing means for laying successive turns of a cable on the drum, fluid powered means for positively moving the traversing means lengthwise of the drum independently of the drum driving means, and means for varying the speed of movement of the traversing means during a portion of the travel thereof.

5. In a cable winding device, the combination with a winding drum and means for driving the drum, of traversing means for laying successive turns of a cable on the drum, fluid powered means for positively moving the traversing means lengthwise relative to the drum independently of the drum driving means, and means controlling said fluid powered means for changing the speed of movement of the traversing means adjacent the opposite ends of the drum.

6. In a cable winding device, traversing mechanism for laying successive turns of cable on a drum, means mounting the traversing mechanism for rectilinear movement, power means for operating the traversing mechanism lengthwise of said mounting means, cable guide means on the traversing mechanism, and means controlled by the cable guide means for changing the direction of movement of the traversing mechanism.

7. In a cable winding device, traversing mechanism for laying successive turns of a cable on a drum, said traversing mechanism including a guide head, means mounting the guide head for rectilinear movement, power means for moving the guide head lengthwise of the mounting means, cable guide means on the guide head, and means controlled by the cable guide means for varying the direction of movement of the guide head by the power means.

8. In a cable winding device, traversing mechanism for laying successive turns of a cable on a drum, said traversing mechanism including a guide head, means mounting the guide head for rectilinear movement, power means for moving the guide head lengthwise of the mounting means, cable guide means on the head, means controlled by the cable guide means for varying the direction of movement of the guide head by the power means, and separate means for changing the speed of movement of the power means adjacent an end of the travel of the guide head.

9. In a cable winding device, the combination with a winding drum, of traversing means for laying successive turns of a cable on a winding surface on the drum, a carriage supporting the traversing means for swinging movement of the traversing means transversely of the axis of the drum to maintain the cable substantially tangent to the winding surface on the drum, a supporting frame, and toothed gear and rack means mounting the carriage on the frame for aligned, bodily movement back and forth relative to the drum transversely of the axis thereof.

10. In a cable winding device, the combination with a winding drum, of traversing means for laying successive turns of a cable on a drum, a track supporting the traversing means for movement thereon lengthwise of the drum, a carriage including means mounting opposite ends of the track thereon, means supporting the carriage for back and forth movement transversely of the axis of the drum, and means for causing uniform movement of opposite ends of the carriage.

11. In a cable winding device, the combination of traversing means adapted to lay successive turns of a cable on a winding drum, a track supporting the traversing means for movement lengthwise thereof, a carriage having means supporting opposite ends of the track for bodily movement of the traversing means transversely relative thereto, a support, and means mounting the carriage on the support for causing positive uniform bodily movement of the opposite ends of the carriage transversely of the length of the track.

12. In a cable winding device, the combination with a winding drum of traversing means for laying successive turns of cable on the drum, means mounting the traversing means for movement longitudinally of the axis of the drum, means mounting the traversing means for movement transversely of the drum, and gear means for maintaining uniform relation of said traversing means with respect to the drum during the transverse movement.

13. In a cable winding device, traversing mechanism for laying successive turns of a cable on a drum including a guide head having cable guide means thereon, power means for moving the guide head in a direction to guide the cable, and means controlled in accordance with the angular direction of feed of the cable from the guide means to the drum for governing the operation of the power means.

14. In a cable winding device, traversing mechanism for laying successive turns of a cable on a drum, comprising a support, a cable guide sheave adapted to bear on the cable, a member supporting said sheave, means mounting said member for movement relative to the support by the pressure of the cable on the sheave, an arm carried by the member, and means operatively connected with the arm for controlling the movement of the traversing mechanism.

15. In a cable winding device having a frame, the combination with a winding drum, of a guide head mounted on said frame for laying successive turns of cable on said drum, motor means mounted on and movable with said guide head, which motor bodily moves said guide head along the axis of said drum, and means responsive to the lateral movement of said cable along the face of said drum for controlling the actuation of said motor.

16. In a cable winding device having a frame, the combination with a winding drum, of a guide head mounted on said frame for laying successive rows of cable on said drum, fluid motor means mounted on and movable with said guide head, which motor bodily moves said guide head longitudinally of the axis of said drum, and valve means responsive to the movement of said cable transversely across the longitudinal face of said drum for controlling the flow of fluid to said motor for actuation thereof.

17. In a cable winding device, the combination with a winding drum, of traversing means for laying successive turns of cable on a winding surface on the drum, a carriage supporting the traversing means, toothed gear means mounting said carriage for aligned bodily shifting movement transversely of the axis of said drum, and pivot means mounted on said carriage for swinging movement of the traversing means relative to the carriage to maintain the cable substantially tangent to a winding surface on said drum.

18. In a cable winding device, the combination with a winding drum, of a motor, of traversing means for laying successive turns of cable on said drum, means mounting said traversing means for bodily movement thereof longitudinally of the axis of said drum and for swinging movement transversely thereof, said motor being adapted to impart longitudinal movement to said traversing means, and means responsive to the lateral movement of said cable for controlling the actuation of said motor.

19. In a cable winding device, traversing mechanism for laying successive turns of a cable on a drum comprising a guide head, a trackway, means mounting the guide head on the trackway for rectilinear movement through a predetermined path thereon, fluid motor means for moving the guide head along said path, valve means for controlling the operation of the fluid motor means, cable guide means on the guide head and arranged for movement by the cable, and means operated by the cable guide means for controlling the operation of the valve means.

20. In a cable winding device, traversing mechanism for laying successive turns of a cable on a drum comprising a guide head, a trackway, means mounting the guide head on the trackway for rectilinear movement through a predetermined path thereon, fluid motor means for moving the guide head along said path, valve means for controlling the operation of the fluid motor means, cable guide means on the guide head and arranged for movement by the cable, means operated by the cable guide means for controlling the operation of the valve means, and means including a cam member arranged at the end of the path of travel of the guide head in position to control the operation of the valve means to increase the speed of movement of the guide head along the trackway.

21. In a cable winding device, traversing mechanism for laying successive turns of a cable on a drum including a trackway, a guide head mounted on the trackway for movement rectilinearly in a path relative thereto, power means connected with the guide head for causing lengthwise movement thereof on the trackway and including fluid operated motor means, valve means for controlling the direction and speed of operation of the motor means, cable guide means on the guide head, means operated by the cable guide means for controlling the valve means to control the direction of operation of the power means for moving the guide head, a cam member carried by the guide head and connected with the valve means, and means adjacent an end of the travel path of the guide head for operating the cam member to move the valve means to change the speed of operation of the power means.

22. In a cable winding device, traversing mechanism for laying successive turns of a cable on a drum including a guide head, cable guide means mounted on the guide head, a track member, supports for opposite end portions of the track member, wheels mounting the guide head on the track member for rectilinear movement relative thereto, a rack member extending lengthwise of the track member and carried by the supports, and a power device connected with the guide head and having operative connection with the rack member for causing movement of the guide head along the track member.

23. In a cable winding device, a main support, a pair of opposed cooperating guide rollers adapted to receive a cable therebetween in guiding relation therewith, shafts mounting the rollers for turning movement, and supports at opposite end portions of the shafts mounting the shafts on the main support, each of said supports including separate members having divergent slots therein arranged to adjust the roller shafts transversely relative to each other upon adjustment of said members with respect to each other.

24. In a cable winding device, the combination with a winding drum and means for driving the drum, of traversing means for laying successive turns of a cable on the drum, fluid powered means for positively moving the traversing means lengthwise relative to the drum independently of the drum driving means, and means for controlling the operation of the power means to direct the cable onto the drum at an acute angle to the axis of the drum whereby to maintain a crowd angle on the turns of cable on the drum throughout the major portion of the length of the drum.

25. In a cable winding device, the combination with a winding drum and means for driving the drum, of traversing means for laying successive turns of a cable on the drum, fluid powered means for positively moving the traversing means lengthwise relative to the drum independently of the drum driving means, means to control the operation of the power means to direct the cable onto the drum at an acute angle to the axis of the drum whereby to maintain a crowd angle on the turns of cable on the drum throughout the major portion of the length of the drum, and means for changing the speed of movement of the traversing means adjacent an end of the drum to cause the end turn of the cable to be applied thereto substantially at a right angle to the axis of the drum.

26. In a cable winding device, the combination with a winding drum, of traversing means for laying successive turns of a cable on the drum, said traversing means including a guide head having a cable guide means thereon, a track extending lengthwise of the drum and supporting the guide head thereon for longitudinal movement, fluid powered traction means connected with the guide head for positively moving said guide head along the track, said cable guide means being arranged to apply a crowd angle to the cable as applied to the drum at an acute angle to the longitudinal axis of the drum throughout the major portion of the length of the drum, and means for changing the speed of movement of the guide head along the track at a point adjacent an end of the drum.

27. In a cable winding device, the combination with a winding drum, of traversing means for laying successive turns of a cable on the drum, power means for moving the traversing means lengthwise of the drum, means to control the operation of the power means to direct the cable onto the drum at an acute angle to the axis of the drum whereby to maintain a crowd angle on the turns of cable on the drum throughout the major portion of the length of the drum, an operating cam element movable with said traversing means and operatively connected with the control means, and a cam roller adjacent an end of the drum in position to be engaged by and actuate the cam element to move the control means whereby to increase the crowd angle of the cable while the cam element is engaged with the cam roller adjacent an end of the drum for the first few turns on each layer.

28. In a cable winding device, traversing mechanism for laying successive turns of a cable on a drum including a trackway, a guide head mounted on the trackway for movement rectilinearly in a path relative thereto, a motor connected with the guide head for causing lengthwise movement thereof on the trackway, means for controlling the direction and speed of operation of the motor, cable guide means on the guide head, means operated by the cable guide means for actuating the motor controlling means to control the direction of operation of the motor for moving the guide head, a cam member carried by the guide head and connected with the motor controlling means, and trip means adjacent an end of the travel path of the guide head for operating the cam member to move the motor controlling means to change the speed of operation of the motor.

29. In a cable winding device, the combination with a winding drum and means for driving the drum, of self-propelled traversing means for laying successive turns of a cable on the drum, powered means carried by said traversing means for positively moving the traversing means lengthwise relative to the drum independently of the drum driving means, means to control the operation of the powered means to direct the cable onto the drum at an acute angle to the axis of the drum whereby to maintain a crowd angle on the turns of cable on the drum throughout the major portion of the length of the drum, and means for controlling said powered means for changing the speed of movement of the traversing means adjacent an end of the drum to cause the end turn of the cable to be applied thereto substantially at a right angle to the axis of the drum.

30. In a cable winding device, the combination with a winding drum, of traversing means for laying successive turns of a cable on the drum, said traversing means including a guide head having cable guide means thereon, a track extending lengthwise of the drum and supporting the guide head thereon for longitudinal movement, traction means connected with the guide head for moving said guide head along the track, said guide means being arranged to apply a crowd angle to the cable as applied to the drum at an acute angle to the longitudinal axis of the drum throughout the major portion of the length of the drum, means for changing the speed of movement of the guide head along the track at a point adjacent an end of the drum, said traction means including motor means, means for controlling the direction and speed of the motor means, and means adjacent opposite ends of the travel of the guide head for actuating said motor controlling means to control the operation of the guide head.

31. In a cable winding device, the combination with a winding drum, of traversing means for laying successive turns of a cable on the drum, said traversing means including a guide head having cable guide means thereon, a track extending lengthwise of the drum and supporting the guide head thereon for longitudinal movement, traction means connected with the guide head for moving said guide head along the track, said guide means being arranged to apply a crowd angle to the cable as applied to the drum at an acute angle to the longitudinal axis of the drum throughout the major portion of the length of the drum, means for changing the speed of movement of the guide head along the track at a point adjacent an end of the drum, said traction means including fluid motor means, valve means for controlling the direction and speed of the motor means, and means adjacent opposite ends of the travel of the guide head for actuating the valve means to control the operation of the guide head.

32. In a cable winding device, the combination with a winding drum, of traversing means for laying turns of a cable on the drum, said traversing means including a guide head having cable guide means thereon, tracks extending transversely and lengthwise of the drum and supporting the guide head thereon for transverse and longitudinal movement, traction means connected with the guide head for moving said guide head along the track which extends lengthwise of said drum, said cable guide means being arranged to apply a crowd angle to the cable as applied to the drum at an acute angle to the longitudinal axis of the drum throughout the major portion of the length of the drum, means for changing the speed of movement of the guide head along the lengthwise track at a point adjacent an end of the drum, said traction means including fluid actuated motor means, valve means for controlling the direction and speed of the motor means, and means adjacent opposite ends of the path of travel of the guide head for actuating the valve means to control the operation of the guide head.

JOHN HART WILSON.

References Cited in the file of this patent

UNITED STATES PATENTS

| Number | Name | Date |
|---|---|---|
| 1,566,641 | Bell | Dec. 22, 1925 |
| 1,629,709 | Jones | May 24, 1927 |
| 1,763,871 | Taylor | June 17, 1930 |
| 1,935,585 | Tornblom | Nov. 14, 1933 |
| 1,941,250 | Dale | Dec. 26, 1933 |
| 2,016,755 | Spracher | Oct. 8, 1935 |
| 2,276,916 | Barrett | Mar. 17, 1942 |
| 2,340,436 | Stone et al. | Feb. 1, 1944 |
| 2,478,486 | Holleron et al. | Aug. 9, 1949 |

FOREIGN PATENTS

| Number | Country | Date |
|---|---|---|
| 686,105 | Germany | Jan. 3, 1940 |